United States Patent
Kim (10) Patent No.: US 10,802,529 B1
(45) Date of Patent: Oct. 13, 2020

(54) PEDAL APPARATUS FOR DRIVER PROTECTION

(71) Applicants: Hyundai Motor Company, Seoul (KR); Kia Motors Corporation, Seoul (KR)

(72) Inventor: Eun Sik Kim, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/532,963

(22) Filed: Aug. 6, 2019

(30) Foreign Application Priority Data

Apr. 15, 2019 (KR) .................. 10-2019-0043488

(51) Int. Cl.
| | |
|---|---|
| *G05G 1/327* | (2008.04) |
| *B60R 21/09* | (2006.01) |
| *G05G 1/44* | (2008.04) |
| *B60K 23/02* | (2006.01) |
| *B60T 7/06* | (2006.01) |
| *B60K 26/02* | (2006.01) |

(52) U.S. Cl.
CPC .............. *G05G 1/327* (2013.01); *B60R 21/09* (2013.01); *G05G 1/44* (2013.01); *B60K 23/02* (2013.01); *B60K 26/02* (2013.01); *B60T 7/065* (2013.01)

(58) Field of Classification Search
CPC .......... G05G 1/327; G05G 1/44; B60R 21/09; B60K 23/02; B60T 7/065
See application file for complete search history.

(56) References Cited

U.S. PATENT DOCUMENTS

| | | | | |
|---|---|---|---|---|
| 5,848,558 | A * | 12/1998 | Isono | B60R 21/09 74/512 |
| 2006/0162481 | A1* | 7/2006 | Sato | B60T 7/065 74/512 |
| 2008/0006119 | A1* | 1/2008 | Tokumo | B60R 21/09 74/560 |
| 2010/0140008 | A1* | 6/2010 | Kim | B60R 21/09 180/271 |
| 2015/0135887 | A1* | 5/2015 | Kim | B60T 7/065 74/512 |

FOREIGN PATENT DOCUMENTS

| | | | | | |
|---|---|---|---|---|---|
| JP | | 2014119927 A | * | 6/2014 | ............... G05G 1/32 |
| KR | 10-2013-0116563 A | | | 10/2013 | |

* cited by examiner

*Primary Examiner* — Vicky A Johnson
(74) *Attorney, Agent, or Firm* — Morgan, Lewis & Bockius LLP (57) ABSTRACT

A pedal apparatus for driver protection, may include a switch bracket rotatably coupled to a pedal member by a hinge pin; and a collision removal pin fixedly connected to the switch bracket and detachably coupled to the pedal member, wherein the switch bracket rotates a pedal arm forwards by contacting with the pedal arm while rotating around the hinge pin when the collision removal pin is detached from the pedal member.

11 Claims, 8 Drawing Sheets

PEDAL APPARATUS FOR DRIVER PROTECTION

CROSS REFERENCE TO RELATED APPLICATION

The present application claims priority to Korean Patent Application No. 10-2019-0043488 filed on Apr. 15, 2019, the entire contents of which is incorporated herein for all purposes by this reference.

BACKGROUND OF THE DISCLOSURE

Field of the Disclosure

The present invention relates to a pedal apparatus for driver protection, and more particularly, to a pedal apparatus for driver protection, which can maximally prevent a driver's leg injury (shin strike, ankle twist, etc.) caused by a pedal apparatus upon occurrence of collision and rear-end collision accidents.

Description of Related Art

In a general vehicle, a dash panel under a driver seat is mounted with an accelerator pedal, a brake pedal, and a clutch pedal that are operated by a driver's foot.

Meanwhile, when collision and rear-end collision accidents occur and an engine compartment is collapsed by a large impact force generated at this time, a problem arises that the driver's leg is injured by a pedal apparatus.

To prevent this, a technology has been developed that additionally applies a separate structure associated with the pedal apparatus, preventing the rearward pushback (the pushback toward the driver seat) of the pedal and preventing the rearward rotation (the rotation toward the driver seat) of the pedal.

However, most of the related arts have a disadvantage in that the number of parts is increased, the weight is increased, and the cost is increased as a technology of additionally applying a separate structure other than the parts forming the pedal apparatus.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pedal apparatus configured for driver protection for preventing the rearward pushback of a pedal arm and preventing the rearward rotation thereof upon occurrence of accident by use of a cowl bracket and a switch bracket coupled to a pedal member, and an object of the present invention is to maximally prevent the driver's leg injury without increasing the number of parts and increasing cost.

A pedal apparatus configured for driver protection of the present invention for achieving the object may include a switch bracket rotatably coupled to a pedal member by a hinge pin; and a collision removal pin fixedly connected to the switch bracket and detachably coupled to the pedal member, and the switch bracket rotates a pedal arm forwards by contacting with the pedal arm while rotating around the hinge pin when the collision removal pin is detached from the pedal member.

The pedal arm is coupled to be rotatable in the front and rear direction around a hinge bolt coupling the pedal arm to the pedal member; the hinge pin is coupled to the pedal member at a rearward side position with respect to the hinge bolt; and the collision removal pin is detachably coupled to the pedal member at a lower side position of the hinge pin.

The pedal apparatus configured for driver protection may further include a cowl bracket fixedly connected to the pedal member; one side of the switch bracket is configured to contact with the cowl bracket in a response that the collision removal pin is detached from the pedal member; the switch bracket rotates around the hinge pin when one side of the switch bracket contacts with the cowl bracket; and the other side of the switch bracket is configured to contact with the pedal arm to rotate the pedal arm forwards in a response that the switch bracket rotates around the hinge pin.

A fixing hole to which the hinge pin is coupled and a fixing groove to which the collision removal pin is detachably coupled are formed in the pedal member; the fixing hole is formed as a hole of a closed curve for preventing detachment of the hinge pin from pedal member; and the fixing groove is formed as an arc groove of an opened structure for detachably coupling the collision removal pin therein.

First and second protrusions are formed at both end portions of the fixing groove to enclose the collision removal pin between the first and second protrusions for fitting and coupling the collision removal pin therebetween.

The diameter of the hinge pin is formed to be greater than or equal to a diameter of the collision removal pin for preventing deformation of the hinge pin.

To prevent rearward pushback and rearward rotation of the pedal arm upon collision, a cross-sectional thickness of the cowl bracket is formed to be thicker than a cross-sectional thickness of the pedal member and a cross-sectional thickness of the switch bracket is formed to be thicker than a cross-sectional thickness of the cowl bracket.

A portion of the cowl bracket contacting with the switch bracket includes a bending forming portion for securing rigidity of the cowl bracket.

The switch bracket may include a member coupling portion to which the hinge pin rotatably coupled to the pedal member is fixed; a cowl contact portion configured for contacting with the cowl bracket in a response that the collision removal pin is detached from the pedal member as a portion which is bent at and extended to one side of the member coupling portion; a switch coupling portion to which the collision removal pin and a switch are fixedly coupled as a portion which is bent at and extended to the other side of the member coupling portion; and a stopper portion for contacting with the pedal arm to rotate the pedal arm forwards in a response that the switch bracket rotates around the hinge pin as a portion which is bent and extended from the switch coupling portion toward the pedal arm.

A slot hole is formed in a portion of the switch coupling portion to which the collision removal pin is coupled; and one end portion of a pedal spring is inserted to be coupled to the collision removal pin.

The pedal apparatus configured for driver protection according to an exemplary embodiment of the present invention can maximally prevent the driver's leg injury caused by the pedal arm as the pedal arm is forcibly rotated forwards to be away from the driver upon occurrence of the collision and rear-end collision accidents, and particularly, a configuration of forcibly rotating the pedal arm forwards is a configuration of using the cowl bracket and the switch bracket, which are previously used, and can implement the driver protection function without largely increasing parts, reducing weight and saving cost as compared with other existing structures.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a pedal apparatus configured for driver protection according to an exemplary embodiment of the present invention will be described with reference to the accompanying drawings.

As illustrated in FIG. 1, FIG. 2, FIG. 3, FIG. 4, FIG. 5, FIG. 6, FIG. 7, and FIG. 8, a pedal apparatus configured for driver protection according to an exemplary embodiment of the present invention includes a pedal member 10 fixed at a dash panel 1 under a driver seat; a pedal arm 30 coupled to the pedal member 10 to be rotatable in the front and rear direction around hinge bolt 21 and a nut 22; a cowl bracket 40 fixedly connected to the upper side of the pedal member 10 by welding and connected to a cowl panel; a hinge pin 50 rotatably coupled to the pedal member 10; a switch bracket 60 fixedly connected to the hinge pin 50 by welding and rotatably coupled to the pedal member 10 by the hinge pin 50; and a collision removal pin 70 fixedly connected to the switch bracket 60 by welding and detachably coupled to the pedal member 10.

The front side of the pedal member 10 is coupled with the dash panel 1, the left and right side surfaces extending from the forward to the rearward are formed in parallel, and the pedal member 10 is formed in an opened structure in the rearward and the vertical direction thereof.

A bolt hole 11 is formed to penetrate the left and right side surfaces of the pedal member 10, and the hinge bolt 21 sequentially penetrates the bolt hole 11 and a hinge pipe 31 of the pedal arm 30 and then, is coupled with the nut 22, such that the pedal arm 30 becomes a structure which is coupled to the pedal member 10 to be rotatable in the front and rear direction around the hinge bolt 21.

The hinge pipe 31 is coupled to the upper end portion of the pedal arm 30 and a pad 32 operated by the driver's foot is coupled to the lower end portion thereof.

A fixing hole 12 to which the hinge pin 50 is coupled and a fixing groove 13 to which the collision removal pin 70 is coupled at the positions of the rearward and the upper side thereof with respect to the bolt hole 11 are formed on the left and right side surfaces of the pedal member 10.

The fixing hole 12 is formed as a hole of a closed curve so that the hinge pin 50 is prevented from being removed from the pedal member 10 upon collision, and conversely, the fixing groove 13 is formed in an arc groove structure of an opened structure so that the collision removal pin 70 is smoothly removed upon collision.

A protrusion 14 is formed at both end portions of the fixing groove 13 to enclose the collision removal pin 70 for fitting and coupling the collision removal pin 70 therebetween.

The protrusion 14 encloses and fixes the collision removal pin 70 inserted into the fixing groove 13, and when the collision removal pin 70 is removed from the fixing groove 13 upon collision, the collision removal pin 70 is removed while crushing the protrusion 14.

The pedal arm 30 is coupled to be rotatable in the front and rear direction around the hinge bolt 21 coupled to the pedal member 10, for driver protection structure upon collision, the hinge pin 50 is coupled to the pedal member 10 at the rearward side position with respect to the hinge bolt 21, and the collision removal pin 70 is detachably coupled to the pedal member 10 at the lower side position of the hinge pin 50.

An exemplary embodiment of the present invention is preferably a structure that the hinge pin 50 is prevented from being deformed upon collision for driver protection upon collision, and for the present purpose, is preferably a structure that the hinge pin 50 is formed to have a diameter greater than or equal to a diameter of the collision removal pin 70 to have sufficient rigidity and strength.

Furthermore, an exemplary embodiment of the present invention is a structure that can prevent the rearward pushback and the rearward rotation of the pedal arm 30 upon collision, for driver protection upon collision, and for the present purpose, the cross-sectional thickness of the cowl bracket 40 is preferably formed to be thicker than that of the pedal member 10, and, the cross-sectional thickness of the switch bracket 60 is preferably formed to be thicker than that of the cowl bracket 40.

An exemplary embodiment of the present invention has more excellent strength and rigidity as the cross-sectional thickness thereof is formed to be thicker.

Therefore, as the collision or rear-end collision accident occurs, one side of the switch bracket 60 can contact with the cowl bracket 40 when the collision removal pin 70 is detached from the pedal member 10, the switch bracket 60 can rotate around the hinge pin 50 when one side of the switch bracket 60 contacts with the cowl bracket 40, and the other side of the switch bracket 60 can contact with the pedal arm 30 to rotate the pedal arm 30 forwards when the switch bracket 60 rotates around the hinge pin 50, preventing the rearward pushback of the pedal arm 30 and preventing the rearward rotation thereof through the operation of the switch bracket 60 to maximally prevent the driver's leg injury caused by the pedal arm 30.

As such, a portion of the cowl bracket 40 that contacts with the switch bracket 60 may be formed as a bending forming portion 41 of a protrusion structure for securing rigidity, maximally preventing deformation when contacting with the switch bracket 60.

A connecting portion 15 for connecting the left and right side surfaces of the pedal member 10 is formed at the upper side of the pedal member 10, and a bottom portion 42 of the cowl bracket 40 is accommodated in the connecting portion 15 to be fixedly coupled by welding.

The connecting portion 15 of the pedal member 10 is formed to be narrower in the width in the front and rear direction than the bottom portion 42 of the cowl bracket 40, and only the forward edge portion of the connecting portion 15 is coupled with the bottom portion 42 of the cowl bracket 40 by welding so that the welded portion is configured as the rotation center of the cowl bracket 40 upon collision.

The switch bracket 60 according to an exemplary embodiment of the present invention includes a member coupling portion 61 to which the hinge pin 50 rotatably coupled to the pedal member 10 is coupled, a cowl contact portion 62 for contacting with the cowl bracket 40 when the collision removal pin 70 is detached from the pedal member 10 as a portion which is bent at and extended to one side of the member coupling portion 61, a switch coupling portion 63 to which the collision removal pin 70 and a switch 80 are fixedly coupled as a portion which is bent at and extended to the other side of the member coupling portion 61, and a stopper portion 64 for contacting with the pedal arm 30 to rotate the pedal arm 30 forwards when the switch bracket 60 rotates around the hinge pin 50 as a portion which is bent and extended from the switch coupling portion 63 toward the pedal arm 30.

The cowl contact portion 62 contacts with the bending forming portion 41 of the cowl bracket 40 when the collision removal pin 70 is detached from the pedal member 10 upon collision.

The switch 80 generates an operating signal of the pedal arm 30, and the pedal bracket 33 is fixedly connected to the pedal arm 30, such that when the driver does not operate the pedal arm 30, the pedal bracket 33 contacts with the switch 80 and at the present time, the signal is not generated, and when the driver operates the pedal arm 30, the pedal bracket 33 is released from the switch 80 and at the present time, the operating signal of the pedal is generated.

An exemplary embodiment of the present invention is a configuration that further includes a pedal spring 90 for returning the pedal arm 30 at the time of operating the pedal arm 30, and both end portions of the pedal spring 90 are fixed to the pedal bracket 33 and the collision removal pin 70.

To couple the pedal spring 90 to the collision removal pin 70 more easily and to also prevent the removal of the pedal spring 90 coupled to the collision removal pin 70, a slot hole 65 straightly extending is formed in the switch coupling portion 63 that forms the switch bracket 60, and becomes a structure that one end portion of the pedal spring 90 formed in an annular shape is inserted through the slot hole 65 and then coupled to the collision removal pin 70.

Hereinafter, an operation of an exemplary embodiment of the present invention will be described.

Figure 1:
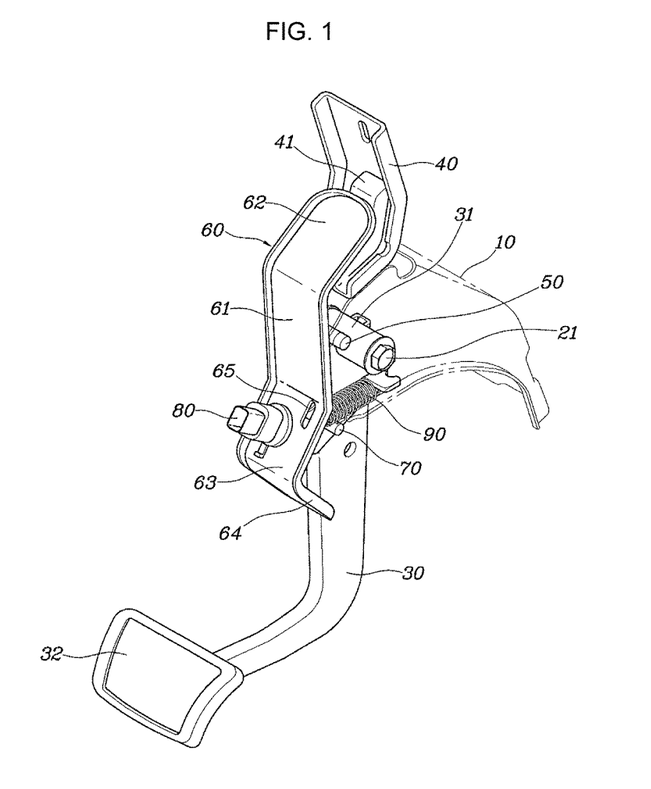
FIG. 1 is a perspective diagram of a pedal apparatus configured for driver protection according to an exemplary embodiment of the present invention.
Figure 2:
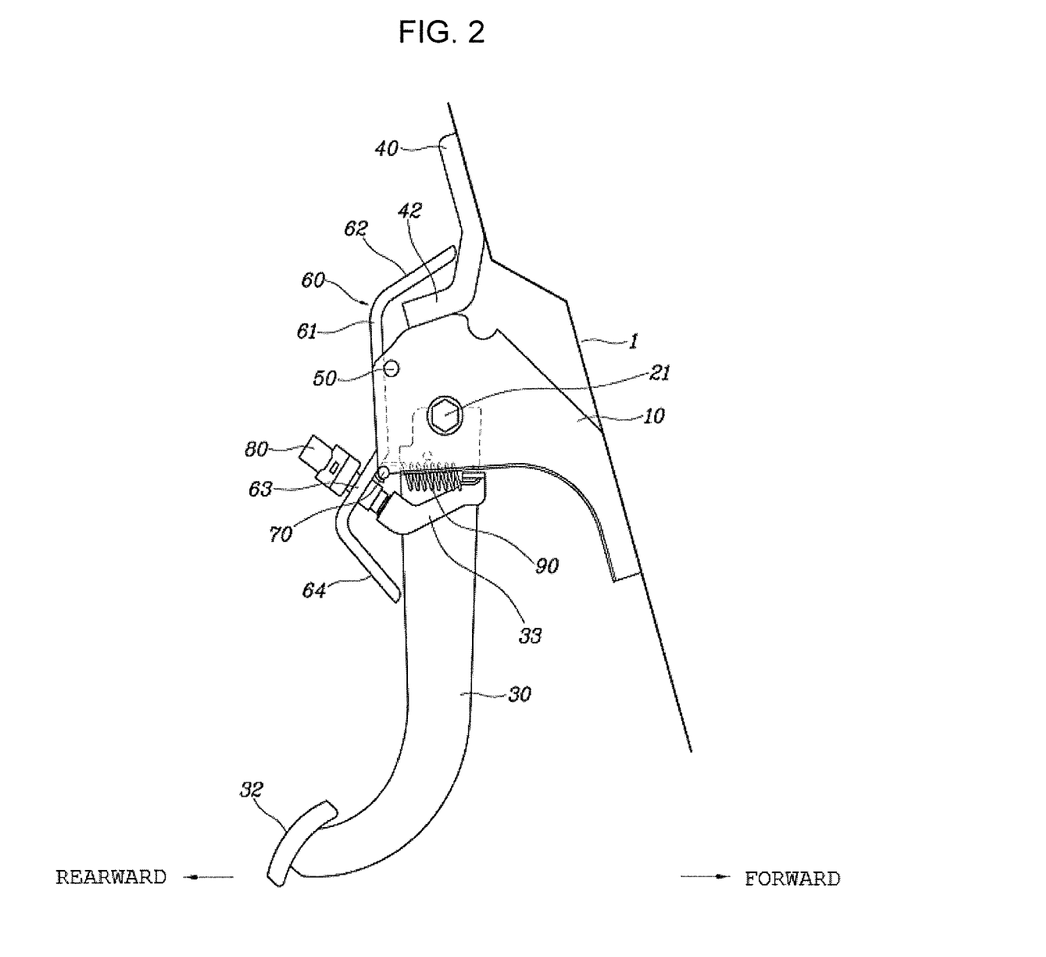
FIG. 2, FIG. 3 and FIG. 4 are a side diagram, a bottom perspective diagram, and an exploded perspective diagram of FIG. 1.
Figure 3:
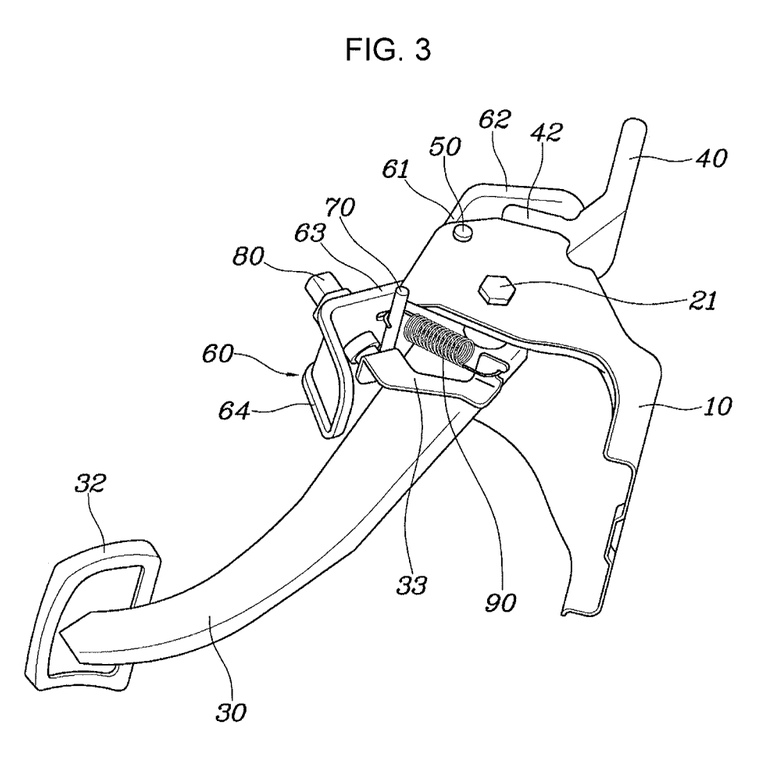
Figure 4:
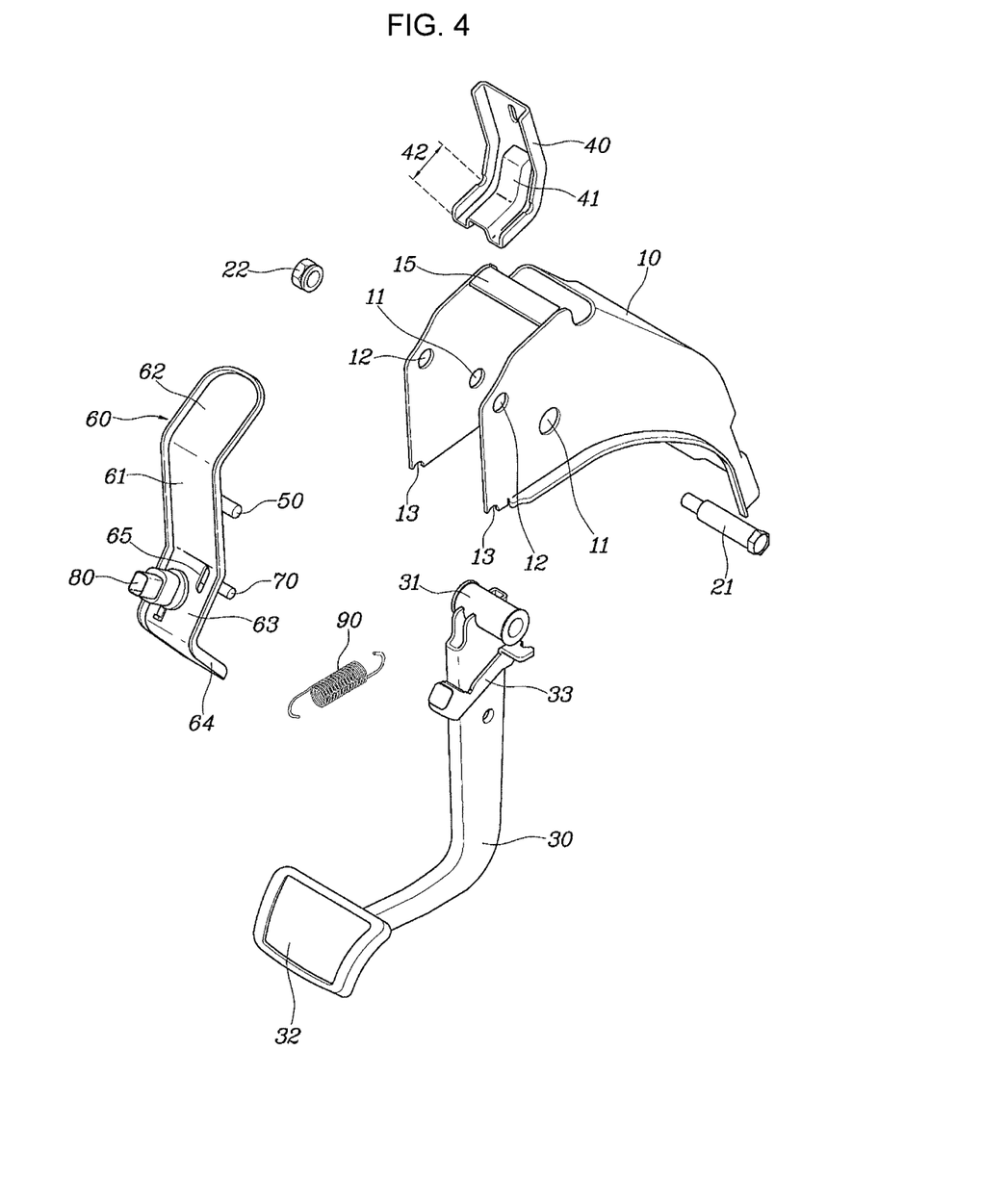
Figure 5:
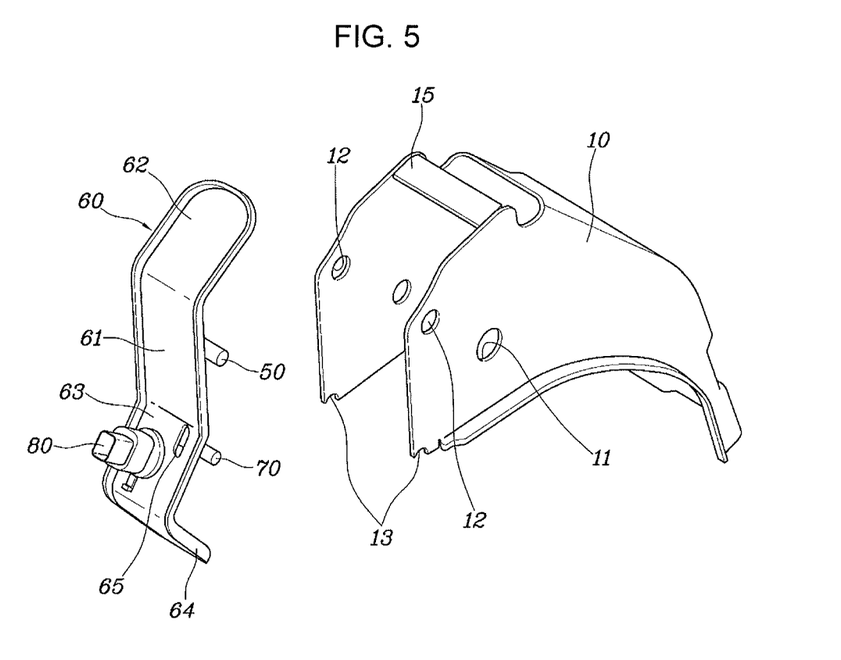
FIG. 5 is an exploded diagram of a pedal member and a switch bracket according to an exemplary embodiment of the present invention.
Figure 6:
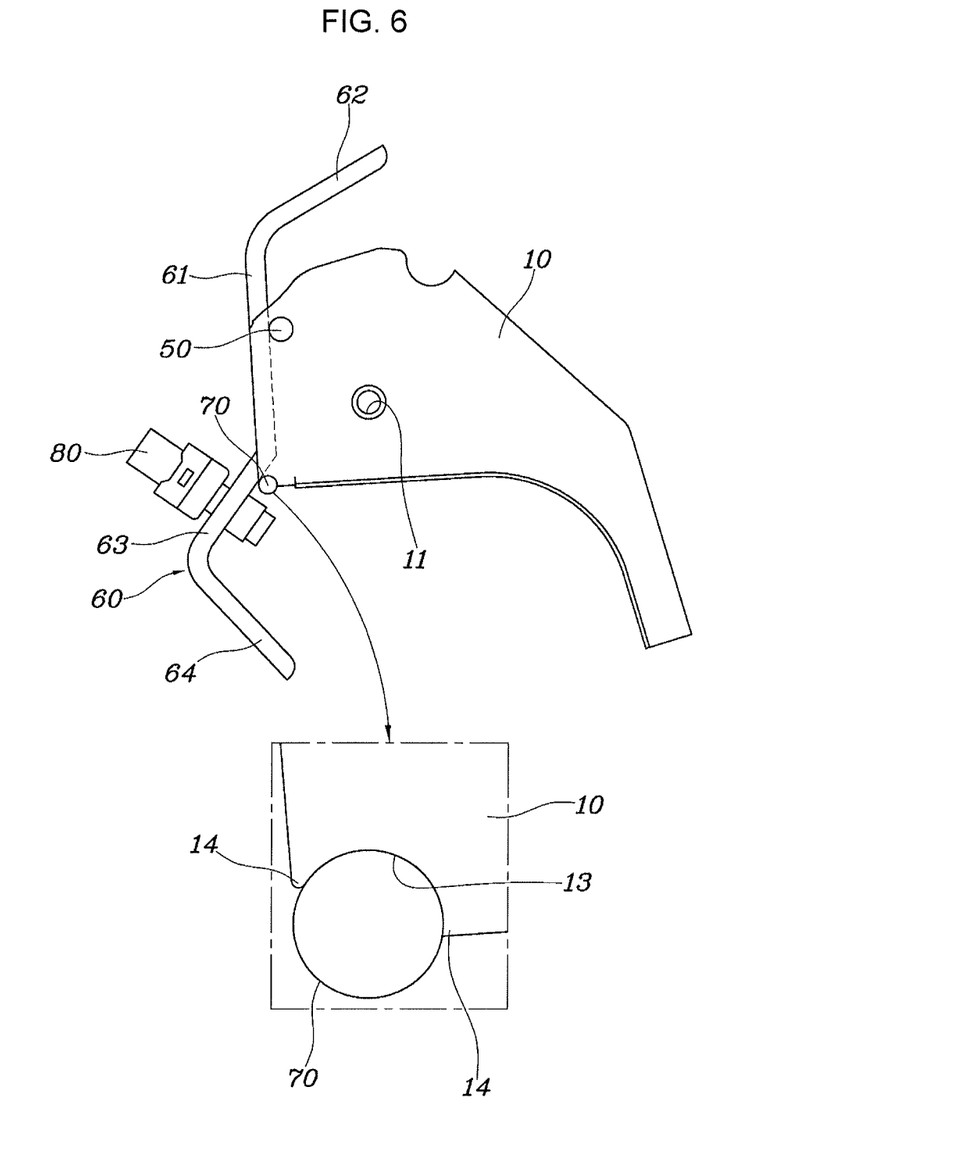
FIG. 6 is a side diagram of the coupling state of FIG. 5.
Figure 7:
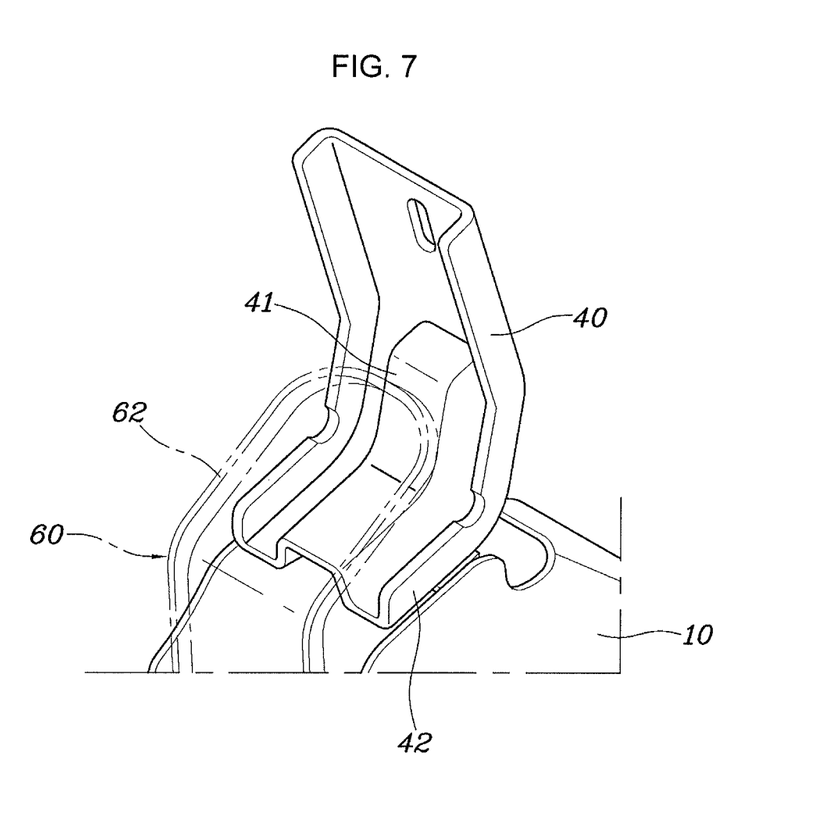
FIG. 7 is an enlarged diagram of a portion where a cowl bracket is disposed in FIG. 1.

FIG. 2 illustrates a normal state where no collision and rear-end collision accidents occur, and when the driver depresses the pedal, the pedal arm 30 rotates in the front and rear direction around the hinge bolt 21.

In the normal state as in FIG. 2, a state where the collision removal pin 70 has been fitted into and fixed to the fixing groove 13 of the pedal member 10 is kept, and therefore, the switch bracket 60 keeps the restraint state that does not rotate around the hinge pin 50 by the collision removal pin 70.

Figure 8:
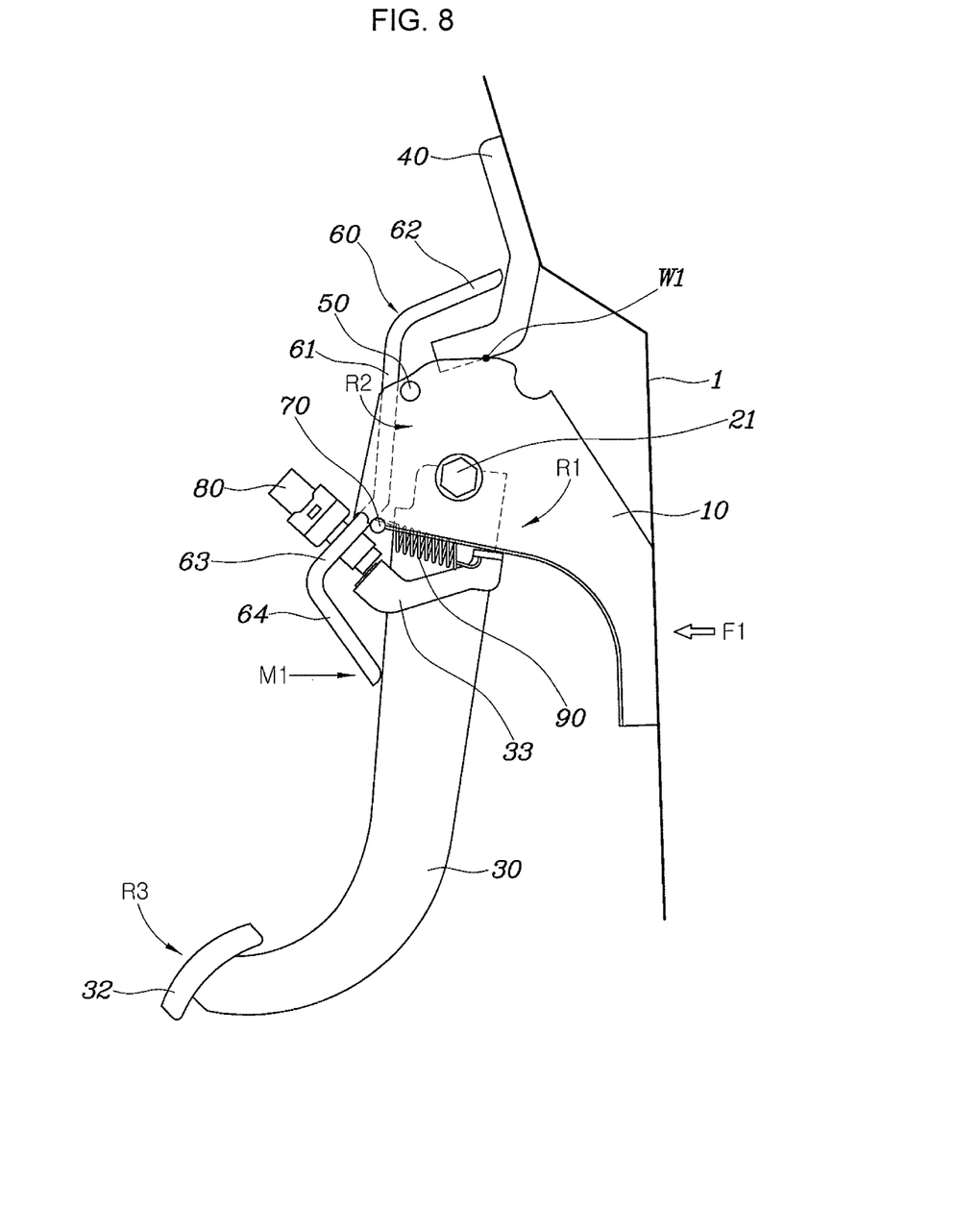
FIG. 8 is a side diagram for explaining an operating state of the pedal apparatus in an accident.

FIG. 8 illustrates a state when the collision and rear-end collision accidents have occurred.

That is, when the dash panel 1 is pushed rearwards (internal side) by the load F1 generated in the collision and rear-end collision accidents, the pedal member 10 rotates clockwise like the illustrated arrow R1 around a welded coupling point W1 with the cowl bracket 40.

When the pedal member 10 rotates, at the present time, the collision removal pin 70 is removed from the fixing groove 13 of the pedal member 10, and the cowl contact portion 62 of the switch bracket 60 contacts with the bending forming portion 41 of the cowl bracket 40 and simultaneously, the switch bracket 60 rotates counterclockwise like the illustrated arrow R2 around the hinge pin 50, the stopper portion 64 of the switch bracket 60 contacts with the pedal arm 30 (the arrow MI) to suppress the rearward pushback and the rearward rotation of the pedal arm 30, and the pedal arm 30 forcibly rotates forwards around the hinge bolt 21 by the continuous counterclockwise rotation of the switch bracket 60 (the arrow R3).

Therefore, in the pedal apparatus according to an exemplary embodiment of the present invention, it is possible for the pedal arm 30 to forcibly rotate forwards to be away from the driver upon occurrence of the collision and rear-end collision accidents, maximally preventing the driver's leg injury caused by the pedal arm 30.

That is, it is possible to prevent the injuries that the driver's shin portion is struck or the driver's ankle is bent and broken backwards by the pedal as the pedal arm 30 is forcibly rotated forwards upon occurrence of accident, maximally preventing the driver's leg injury caused by the pedal arm 30.

Furthermore, an exemplary embodiment of the present invention is a configuration that a configuration of forcibly rotating forwards the pedal arm 30 upon occurrence of accident may be implemented by the cowl bracket 40, the switch bracket 60 having a changed shape, and the hinge pin 50 and the collision removal pin 70 coupled to the switch bracket 60, which are previously used, and can implement the driver protection function without largely increasing the parts.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A pedal apparatus for driver protection, the pedal apparatus comprising:
 a pedal member;
 a switch bracket rotatably coupled to the pedal member by a hinge pin; and
 a collision removal pin fixedly connected to the switch bracket and detachably coupled to the pedal member,
 wherein the switch bracket is configured to rotate a pedal arm rotatably coupled to the pedal member, forwards by contacting with the pedal arm while rotating around the hinge pin in a response that the collision removal pin is detached from the pedal member,
 wherein the pedal member includes a fixing groove to which the collision removal pin is detachably coupled, and
 wherein the fixing groove is formed as an arc groove for detachably coupling the collision removal pin therein.

2. The pedal apparatus for driver protection according to claim 1,
 wherein the pedal arm is rotatable around a hinge bolt coupling the pedal arm to the pedal member,
 wherein the hinge pin is coupled to the pedal member at a rearward side position with respect to the hinge bolt, and
 wherein the collision removal pin is detachably coupled to the pedal member at a lower side position of the hinge pin.

3. The pedal apparatus for driver protection according to claim 1, further including a cowl bracket fixedly connected to the pedal member,
 wherein a side of the switch bracket is configured to contact with the cowl bracket in the response that the collision removal pin is detached from the pedal member,
 wherein the switch bracket is configured to rotate around the hinge pin in a response that a first side of the switch bracket contacts with the cowl bracket, and
 wherein a second side of the switch bracket is configured to contact with the pedal arm to rotate the pedal arm forwards in a response that the switch bracket rotates around the hinge pin.

4. The pedal apparatus for driver protection according to claim 3,
 wherein, to prevent rearward pushback and rearward rotation of the pedal arm upon collision, a cross-sectional thickness of the cowl bracket is formed to be thicker than a cross-sectional thickness of the pedal member and a cross-sectional thickness of the switch bracket is formed to be thicker than a cross-sectional thickness of the cowl bracket.

5. The pedal apparatus for driver protection according to claim 3,
 wherein a portion of the cowl bracket contacting with the switch bracket includes a bending forming portion for securing rigidity of the cowl bracket.

6. The pedal apparatus for driver protection according to claim 3, wherein the switch bracket includes:
 a member coupling portion to which the hinge pin rotatably coupled to the pedal member is fixed;
 a cowl contact portion configured for contacting with the cowl bracket in the response that the collision removal pin is detached from the pedal member, wherein the cowl contact portion is a portion which is bent at and extended to a first side of the member coupling portion;
 a switch coupling portion to which the collision removal pin and a switch are fixedly coupled, wherein the switch coupling portion is a portion which is bent at and extended to a second side of the member coupling portion; and
 a stopper portion for contacting with the pedal arm to rotate the pedal arm forwards in a response that the switch bracket rotates around the hinge pin, wherein the stopper portion is a portion which is bent and extended from the switch coupling portion toward the pedal arm.

7. The pedal apparatus for driver protection according to claim 6,
 wherein a first end portion of a pedal spring is coupled to the collision removal pin and a second end portion of the pedal spring is coupled to the pedal arm.

8. The pedal apparatus for driver protection according to claim 7,
 wherein a slot hole is formed in a portion of the switch coupling portion and the first end portion of the pedal spring is configured to be coupled to the collision removal pin by use of the slot hole.

9. The pedal apparatus for driver protection according to claim 1,
 wherein the pedal member includes a fixing hole to which the hinge pin is coupled and
 wherein the fixing hole is formed as a hole of a closed curve for preventing detachment of the hinge pin from pedal member.

10. The pedal apparatus for driver protection according to claim 1,
 wherein the fixing groove of the pedal member is integrally formed on each of two portions of the pedal member as two fixing grooves, and the two portions are spaced at a predetermined interval from each other,
 wherein a first protrusion is formed at a first end portion of each of the two fixing grooves,
 wherein a second protrusions is formed at a second end portion of each of the two fixing groove grooves, and
 wherein the first protrusion and the second protrusion are formed to enclose the collision removal pin between the first and second protrusions for fitting and coupling the collision removal pin between the first protrusion and the second protrusion.

11. The pedal apparatus for driver protection according to claim 1, wherein a diameter of the hinge pin is formed to be greater than or equal to a diameter of the collision removal pin for preventing deformation of the hinge pin.

\* \* \* \* \*